(12) United States Patent
Rogers et al.

(10) Patent No.: US 8,496,285 B2
(45) Date of Patent: Jul. 30, 2013

(54) DYNAMICALLY ADJUSTABLE AERODYNAMIC VEHICLE DEVICES

(75) Inventors: Matthew C. C. Rogers, Portland, OR (US); Justin Yee, Scappoose, OR (US); Blake Kashiwagi, Portland, OR (US); Matthew Guilfoyle, Portland, OR (US); John Brzustowicz, Portland, OR (US); Robert McFarlane, Molalla, OR (US); Bruno Banceu, Camas, WA (US)

(73) Assignee: Daimler Trucks North America LLC, Portland, OR (US)

( * ) Notice: Subject to any disclaimer, the term of this patent is extended or adjusted under 35 U.S.C. 154(b) by 155 days.

(21) Appl. No.: 13/079,368

(22) Filed: Apr. 4, 2011

(65) Prior Publication Data

US 2011/0241377 A1    Oct. 6, 2011

Related U.S. Application Data

(60) Provisional application No. 61/320,647, filed on Apr. 2, 2010, provisional application No. 61/370,388, filed on Aug. 3, 2010.

(51) Int. Cl.
*B62D 35/00* (2006.01)

(52) U.S. Cl.
USPC .................. 296/180.1; 296/180.3; 296/180.5; 180/903

(58) Field of Classification Search
USPC ... 296/180.1–180.5, 181.5; 180/903; 105/1.1, 105/1.3
See application file for complete search history.

(56) References Cited

U.S. PATENT DOCUMENTS

| | | | |
|---|---|---|---|
| 2,101,793 | A | 6/1936 | Field, Jr. |
| 3,711,146 | A | 1/1973 | Madzsar et al. |
| 4,102,548 | A | 7/1978 | Kangas |
| 4,607,874 | A | 8/1986 | Peairs |
| 4,824,165 | A | 4/1989 | Fry |
| 4,904,015 | A | 2/1990 | Haines |
| 5,536,062 | A | 7/1996 | Spears |
| 6,846,035 | B2 | 1/2005 | Wong et al. |
| 6,886,882 | B2 | 5/2005 | Farlow et al. |
| 6,926,346 | B1 | 8/2005 | Wong et al. |
| 7,374,229 | B1 | 5/2008 | Noll et al. |
| 7,712,822 | B2 | 5/2010 | Pfaff |

(Continued)

FOREIGN PATENT DOCUMENTS

| | | |
|---|---|---|
| DE | 3620843 A1 | 12/1987 |
| GB | 2089303 A | 6/1982 |
| GB | 2465393 A * | 5/2010 |

OTHER PUBLICATIONS

Vindicator Laser Wind Sensor (NPL Doc. www.catchthewindinc.com/products/vindicator as existed on Dec. 19, 2008, accessed via the Internet Archive Wayback Machine on Nov. 14, 2012).*

*Primary Examiner* — Glenn Dayoan
*Assistant Examiner* — Jason S Daniels
(74) *Attorney, Agent, or Firm* — Klarquist Sparkman, LLP (57) ABSTRACT

Adjustable aerodynamic devices are controlled to control the drag on a vehicle. In one form, control is accomplished in response to pressure from a plurality of pressure sensors. In another form, control is accomplished in response to air movement measurements, such as of wind speed and direction at a location that a vehicle has yet to reach. In another form, the position and location of air vortices between a cab and trailer can be determined and adjusted to adjust the drag by controlling aerodynamic devices.

25 Claims, 8 Drawing Sheets

U.S. PATENT DOCUMENTS

| | | |
|---|---|---|
| 2009/0160159 A1 | 6/2009 | Alguera |
| 2009/0184539 A1 | 7/2009 | Pursley |
| 2010/0060029 A1 | 3/2010 | Hjelm et al. |
| 2010/0201152 A1* | 8/2010 | Smith ........................ 296/180.3 |

* cited by examiner

DYNAMICALLY ADJUSTABLE AERODYNAMIC VEHICLE DEVICES

CROSS REFERENCE TO RELATED APPLICATION

The present application claims the benefit of U.S. Provisional Application No. 61/320,647, filed Apr. 2, 2010, and U.S. Provisional Application No. 61/370,388, filed Aug. 3, 2010.

FIELD

This disclosure pertains to dynamically adjustable aerodynamic vehicle devices that can be adjusted to optimize aerodynamic drag on the vehicle.

BACKGROUND

Side extenders and spoilers with movable air deflectors have been used to reduce the drag on a vehicle equipped with such devices. For example, a roof spoiler on the cab of a vehicle when in an up position can assist in deflecting air over the top of a tall trailer being towed by a truck tractor. In contrast, when in a lowered position, the spoiler minimally impacts the airstream, such as when the truck is towing a flatbed trailer or no trailer at all. Similarly, side extenders have been used to deflect air outwardly for flow past the side walls of a trailer.

As another example, U.S. Pat. No. 6,846,035 to Wong et al. is understood to disclose side extenders movable from a stowed position in which the side extenders are folded toward a rear wall of a truck and a deployed position wherein the side extenders extend rearwardly and somewhat outwardly from the rear wall of the truck to deflect air past a trailer being towed. In this device, the side extenders can also be extended in length to overlay the gap between the truck tractor and trailer. The side extenders are positioned in their respective deployed and extended positions in response to the vehicle exceeding a predetermined speed. In addition, the proximity of the trailing edges of the extenders to the trailer can be reduced as the speed of the vehicle is increased.

Although aerodynamic devices exist, a need nevertheless exists for improvements in such devices and in their control.

SUMMARY

As disclosed herein, dynamically adjustable aerodynamic vehicle devices, and more specifically air deflector portions of such devices, can be adjusted as the vehicle is operated in response to changing vehicle operating conditions. Such vehicle operating conditions can include wind conditions and vehicle configurations, such as a change in the type of trailer being towed by a truck. Adjustments to the aerodynamic devices can be made to optimize aerodynamic drag on the vehicle. Optimal drag can be dependent upon the driving situation. For example, less drag can be optimal to increase fuel efficiency and enhance acceleration. Greater drag can also be optimal under certain conditions, for example such as to enhance or supplement braking, such as on a steep decline.

In accordance with one aspect of the disclosure, various selectable preset positions of aerodynamic devices relative to the vehicle can be established such as corresponding to various vehicle configurations. Examples of vehicle configurations include the towed trailer type, trailer dimensions and/or the gap between a tractor and trailer. Each preset configuration can statistically optimize the aerodynamic drag with respect to the corresponding vehicle configuration. These preset configurations can be stored, such as in memory associated with a controller in the form of a lookup table or otherwise. In response to data indicating the vehicle configuration, the corresponding preset positions can be determined with the aerodynamic devices being adjusted to match the presets. Presets for aerodynamic devices for a vehicle type can be determined in a number of ways, such as by measuring drag in a wind tunnel as the aerodynamic devices are adjusted to select desirable presets for a given vehicle type and/or a vehicle type and trailer type.

In accordance with another aspect, a plurality of air pressure sensors can be used to measure air pressure on specific surfaces of a vehicle and/or trailer with these measurements being used to control the adjustment of air deflector portions of aerodynamic devices to optimize aerodynamic drag. These measurement surfaces can be on front portions of a trailer and/or rear portions of a tractor and/or both. Using the air pressure measurements, the aerodynamic devices can be adjusted to alter the drag.

In accordance with a still further aspect of this disclosure, pressure sensors can be used to determine the size and positioning of one or more vortices in the gap between a truck tractor and trailer as the trailer is being towed by the tractor, such as on a highway or the roadway. The aerodynamic devices can be adjusted to adjust the size and/or position of the vortices with the drag being adjusted with the adjustment in the position and/or size of the vortices.

As a still further aspect of this disclosure, wind speed and wind direction (air motion) can be measured at locations remote from a vehicle, such as at a distance in front of the vehicle. In response to such measurements, the aerodynamic devices can be adjusted proactively or predictively to desired states in anticipation of the vehicle encountering the measured winds to result in optimized drag when the vehicle reaches the location of the expected wind conditions.

One or more of these aspects can be combined and/or be separately included in an aerodynamic device control system. For example, initial preset state values can be used to establish initial conditions of aerodynamic devices of a vehicle with dynamic feedback from pressure sensors and/or wind measurement apparatus being used to adjust the positions of aerodynamic devices from their preset positions. Alternatively, pressure sensor control can be used independently of these other approaches. In addition, wind measurement control can be used separately or in combination with one or more of these other approaches.

It should be noted that this disclosure is directed toward novel and non-obvious aspects of aerodynamic devices and their control disclosed herein, both independently and in combinations and sub-combinations with one another. More specific exemplary aspects of embodiments are referenced below.

In accordance with one embodiment, a vehicle comprises a cab comprising a rear wall. At least one adjustable aerodynamic device is coupled to the cab and comprises at least one movable air deflector portion movable relative to the cab to vary the air pressure behind the rear wall in response to movement of the air deflector. A deflector adjuster, such as motors and/or cylinders under the control of a controller, is coupled to the air deflector and comprises at least one input for receiving pressure indicating signals from pressure sensors that measure the pressure rearwardly of the rear wall of the cab. The deflector adjuster in this embodiment is responsive to the pressure indicating signals to adjust the position of the air deflector portion relative to the rear wall of the cab in response to the pressure signals to thereby adjust the pressure behind the rear wall, such as the pressure on the front wall of a towed trailer. As a result, the drag on the vehicle is adjusted. The at least one aerodynamic device can comprise first and second side extenders. In addition, the received pressure signals can correspond to pressure measured along the front wall of a towed trailer. In an aspect of an embodiment, the received pressure signals can correspond to pressure measured at locations on opposite sides of the center line of a towed trailer.

In accordance with another aspect of an embodiment, the vehicle can comprise a truck or truck tractor supporting the cab in combination with a trailer coupled to the tractor for towing by the tractor, the trailer including a front surface. In addition, in this embodiment, at least one array of trailer supported pressure sensors can be coupled to a front surface of the trailer with each pressure sensor being operable to measure the pressure of air adjacent to the location of the pressure sensor and to produce a pressure signal corresponding to the measured pressure. Desirably, at least two of the pressure sensors are coupled to the front wall of the trailer on opposite sides of the longitudinal center line of the trailer. In addition, the air deflector adjuster is responsive to the pressure signals from the array of pressure sensors to adjust the movable air deflector portion. In this embodiment, one or more additional pressure sensors, such as at least one pressure sensor can also be coupled to the rear wall of the tractor.

In accordance with an aspect of an embodiment, the front wall of the trailer can have first and second corners and the array of pressure sensors can comprise first and second sets of plural pressure sensors in a common horizontal plane with the first set of pressure sensors being adjacent to the first corner and the second set of pressure sensors being adjacent to the second corner. In accordance with another aspect of an embodiment, the first set of pressure sensors can comprise a first pressure sensor positioned adjacent to a respective side of the trailer and adjacent to the first corner, a second pressure sensor positioned at the front of the trailer adjacent to the first corner, and a third pressure sensor positioned intermediate to the first and second sensors adjacent to the first corner; and the second set of pressure sensors can comprise a first pressure sensor positioned adjacent to the side of the trailer adjacent to the second corner, a second pressure sensor positioned at the front of the trailer adjacent to the second corner, and a third pressure sensor positioned intermediate to the first and second sensors adjacent to the second corner. As a further aspect of an embodiment, the deflector adjuster can comprise a controller operable to determine a pressure distribution gradient across the respective sets of pressure sensors. As yet another aspect of an embodiment, the array of pressure sensors can comprise plural pressure sensors coupled to the front of the trailer with at least some of the pressure sensors being at different elevations and at different transverse spacings. As a further aspect of an embodiment, the array of sensors can comprise plural pressure sensors in a common vertical plane intersecting the longitudinal center line of the trailer.

In accordance with an aspect of embodiments disclosed herein, the air deflector adjuster can be operable to adjust at least one of the aerodynamic devices while the vehicle is traveling in response to changing air pressure measurements by the pressure sensors.

In accordance with an embodiment, pressure sensors can be coupled to the rear wall of a cab of the tractor and an array of pressure sensors can be coupled to the front wall of the trailer, the pressure sensors being positioned such that a controller of the air deflector adjuster is operable to determine the position and magnitude of one or more vortices located in a gap between a front of the trailer and rear wall of the tractor. In accordance with an aspect of this embodiment, the at least one aerodynamic device comprises first and second side extenders, the air deflector adjuster being operable to adjust the first and second side extenders to adjust the magnitudes of the vortices relative to one another and/or the positions of the vortices relative to the tractor and trailer.

As a further aspect of an embodiment, the air deflector adjuster can be operable to determine and the adjust fore-aft positioning of the vortices between the front surface of the trailer and rear surface of the tractor and to determine and adjust the side-to-side positioning of the vortices.

As a still further aspect of an embodiment, the at least one aerodynamic device can comprise plural aerodynamic devices comprising a respective air deflector portion, and wherein the air deflector adjuster is operable to adjust the movable air deflector portion of a first of the aerodynamic devices and is operable to simultaneously adjust a second of the aerodynamic devices, the adjustments being in response to signals from one or more pressure sensors.

As yet another embodiment, the movable air deflector portion can comprise a deformable frame supporting a skin or cover, the deformable frame being distorted by the air deflector adjuster to deform the frame to contort the skin to thereby move the air deflector portion. In this embodiment, the skin can comprise a resilient material. As an aspect of this embodiment, the deformable frame can be deformed to contort the skin based on the cross-sectional shape of the trailer.

As another embodiment, a vehicle can comprise a cab including a rear wall; a first side extender projecting rearwardly from the cab with at least a portion of the first side extender projecting rearwardly of the rear wall at a first side of the longitudinal axis of the cab, a second side extender projecting rearwardly from the cab with at least a portion of the second side extender projecting rearwardly of the rear wall of the cab at a second side of the longitudinal axis of the cab opposite to the first side of the longitudinal axis, the first side extender comprising a respective first movable air deflector portion and the second side extender comprising a second movable air deflector portion; an air deflector position controller coupled to the first and second air deflector portions and being operable to control the positions of the first and second air deflector portions; plural pressure sensors positioned to sense pressures between the cab and the front wall of a trailer upon towing of the trailer by the cab, the pressure sensors providing pressure signals indicating the location of first and second wind vortices that are established between the rear wall of the cab and front wall of the trailer as the cab travels in a forward direction at sufficient speed to generate the wind vortices; and the air deflector position controller being operable to control the position of the first and second air deflectors to adjust the position of the vortices in response to the pressure signals. In accordance with an aspect of this embodiment, the air deflector position controller can be operated to adjust the positions of the first and second air deflectors in response to pressure signals to cause the vortices to be positioned on opposite sides of the longitudinal center line of the cab. In accordance with another aspect of this embodiment, the air deflector position controller can be operated to adjust the positions of the first and second air deflectors in response to pressure signals to cause the vortices to be positioned substantially the same distance from the longitudinal center line of the cab and substantially the same distance from the rear wall of the cab and the front wall of the towed trailer. As another aspect of this embodiment, the air deflector position controller can be operated to adjust the positions of the first and second air deflectors in response to signals to adjust the size of the vortices to be substantially the same. This embodiment can include a towed trailer.

As a further embodiment, a vehicle can comprise a first side extender coupled to the vehicle and comprising a first air deflector, a second side extender coupled to the vehicle and comprising a second air deflector, and at least one remote air motion sensor coupled to the vehicle. The air motion sensor can be operable to measure the speed and direction of wind at a location remote from the vehicle. The air motion sensor can comprise an output at which a wind indicating output signal is provided that indicates the measured wind speed and direction. A control system can be coupled in signal communication with the aerodynamic device and the air motion sensor, the control system being operable to adjust the position of the first and second air deflectors in response to the wind indicating output signal and thereby based on the measured remote air motion. As an aspect of an embodiment, the air motion sensor can measure the direction of the motion of air at an angle relative to the longitudinal axis of the vehicle. As another aspect of an embodiment, the air motion sensor can comprise a laser that interacts with air remote from the vehicle. The air motion sensor can, for example, measure air motion up to at least 300 meters from the sensor. In accordance with yet another aspect of an embodiment, the air motion sensor can measure the speed and direction of the motion of air at plural locations remote from the vehicle simultaneously and provide plural wind indicating output signals each corresponding to the measurement of the speed and direction of the motion of air at a respective one of the locations. The control system can be operable to determine wind shear and acceleration of air from the plural wind indicating output signals at a location remote from the vehicle. In accordance with an aspect of an embodiment, the control system can be operated to predictively adjust the air deflector of the aerodynamic device based on the measured remote air motion before the measured air interacts with the vehicle.

As a further aspect of an embodiment the angle of the one of the first and second air deflectors at the windward side of the vehicle can be adjusted to a greater extent than the one of the first and second air deflectors at the leeward side of the vehicle. As another aspect of an embodiment, the angle of the one of the first and second air deflectors at the windward side of the vehicle can be shifted outwardly to increase the angle between the air deflector and a line parallel to the longitudinal center line of the vehicle in response to an increase in measured wind speed. In accordance with this aspect of an embodiment, the one of the first and second air deflectors at the leeward side of the vehicle can be shifted inwardly to decrease the angle between the air deflector and a line parallel to the longitudinal center line of the vehicle in response to an increase in the wind speed at the windward side of the vehicle. In accordance with a further aspect of this embodiment, the angle of the air deflector at the windward side of the vehicle can be adjusted a greater extent than the adjustment at the angle of the air deflector at the leeward side of the vehicle in response to an increase in wind speed.

In accordance with another embodiment, a trailer comprises a front wall; a plurality of pressure sensors coupled to the front wall of the trailer; and the pressure sensors can comprise first and second sets of plural sensors at each side of the longitudinal center line of the trailer, one such set of sensors being positioned adjacent to a first front corner of the trailer and a second such set of sensors being positioned adjacent to a second front corner of the trailer.

In accordance with one embodiment of a method disclosed herein, the method can comprise setting one or more aerodynamic devices coupled to a tractor to a preset configuration based on the shape of a trailer coupled to the tractor and based on the length of a gap between the tractor and the trailer, the preset configuration being selected from a database correlating aerodynamic device configurations, trailer shapes and gap sizes; while the tractor and trailer are traveling, measuring one or more of the air pressure adjacent to the tractor, the air pressure adjacent to the trailer and the air motion speed and angle relative to the longitudinal axis of the tractor at a location that the tractor and trailer have yet to reach; and adjusting the position of at least one of the one or more aerodynamic devices in response to at least one of the measured one or more of the air pressure adjacent to the tractor, the air pressure adjacent to the trailer and the air motion speed and angle relative to the longitudinal axis of the tractor at a location that the tractor and trailer have yet to reach.

The foregoing and other objects, features, and advantages of the invention will become more apparent from the following detailed description, which proceeds with reference to the accompanying figures.

DETAILED DESCRIPTION

The following description is exemplary in nature and is not intended to limit the scope of the invention in any way. Various changes to the described methods may be made in the function and arrangement of the elements described herein without departing from the scope of the invention.

As used in this application and in the claims, the singular forms "a," "an," and "the" include the plural forms unless the context clearly dictates otherwise. Additionally, the term "includes" means "comprises." Further, the term "coupled" means electrically, electromagnetically, and/or physically (e.g., mechanically or chemically) coupled or linked and does not exclude the presence of intermediate elements between the coupled or associated items, absent specific contrary language. In addition, the term "and/or" means "and", "or" and both "and" and "or".

Described herein are dynamically adjustable aerodynamic vehicle devices that can be adjusted in response to changing vehicle configurations, winds, and/or other conditions, to optimize aerodynamic drag on the vehicle. Exemplary adjustable aerodynamic devices can include, but are not limited to: land vehicle components such as side extenders, roof spoilers, trim tabs, roof fairings, chassis skirts, bumpers, trailer treatments, and underbody elements. Also described herein are control systems and methods for dynamically adjusting the aerodynamic devices.

The embodiments described herein are described with reference to tractor-trailer type vehicles, but these are non-limiting examples. Other vehicles can utilize the features described herein.

An optimal drag can be dependent upon the driving situation. Less drag can be optimal, for example to increase fuel efficiency and enhance acceleration. Greater drag can also be optimal, for example to enhance or supplement braking, such as on a steep decline.

In one aspect, various selectable preset configurations of the aerodynamic devices relative to the vehicle can be set, each corresponding to certain vehicle configurations. For example, for a truck that is intended to tow a trailer, vehicle operating characteristics such as the trailer type, trailer dimensions, and/or the gap between the tractor and the trailer can be taken into account with the initial or preset configurations of the aerodynamic devices being established based upon such characteristics. Each preset configuration can be set, for example, to statically optimize the aerodynamic drag with respect to the corresponding vehicle configurations.

Figures 1, 2, 3, 4, 5:
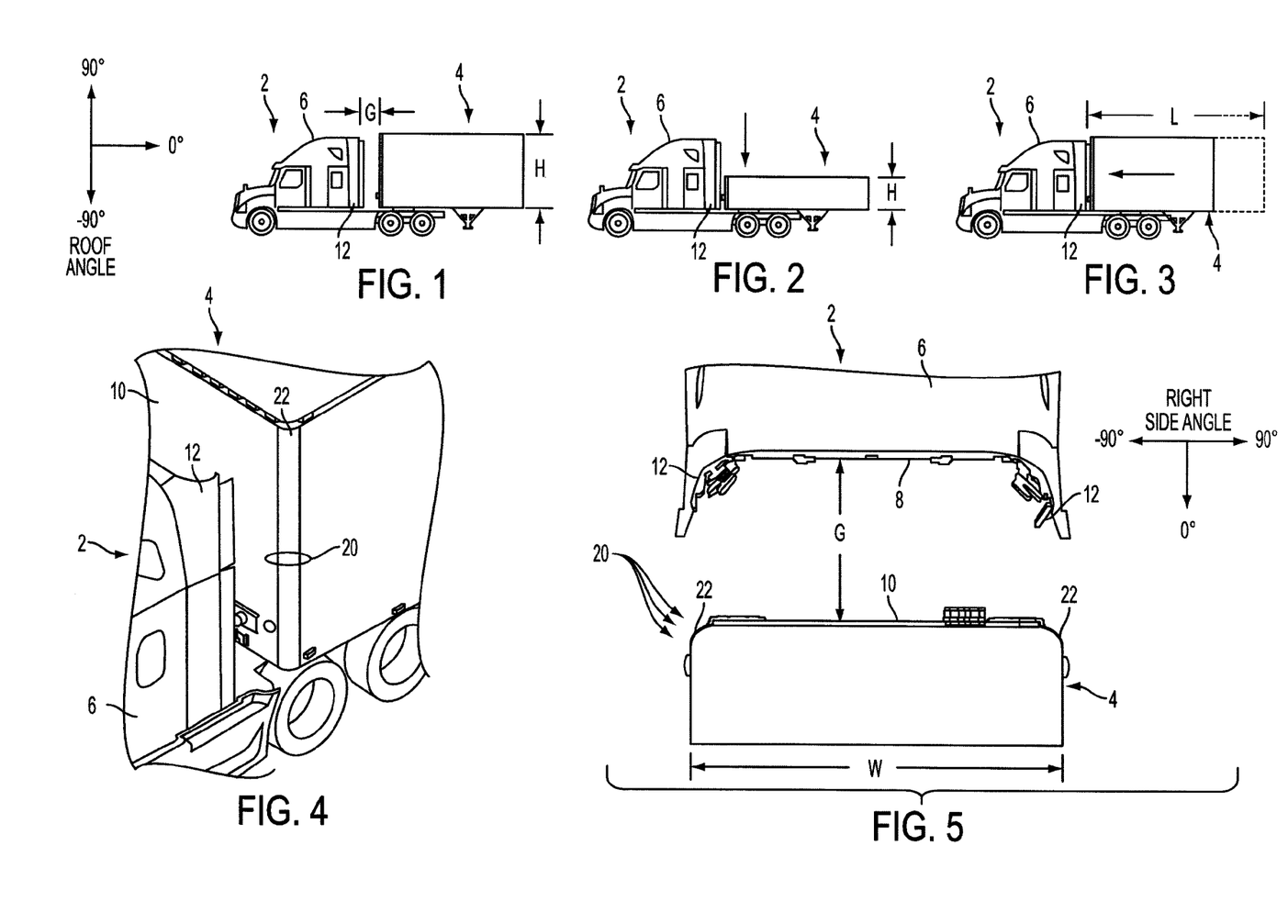
FIG. 1 is a side elevational view of a truck towing a trailer having a height H and a gap G between the rear wall of the truck tractor and the front wall of the trailer.
FIG. 2 is a side elevational view of a truck towing a trailer that is shorter than the trailer in FIG. 1.
FIG. 3 is a side elevational view of a truck towing a trailer with a gap between the truck rear wall and the trailer being reduced in comparison to the gap in FIG. 1.
FIG. 4 is an enlarged view of a portion of a truck and trailer.
FIG. 5 is a top view of the truck and trailer of FIG. 4, without the towing connections being shown.
Figure 6:
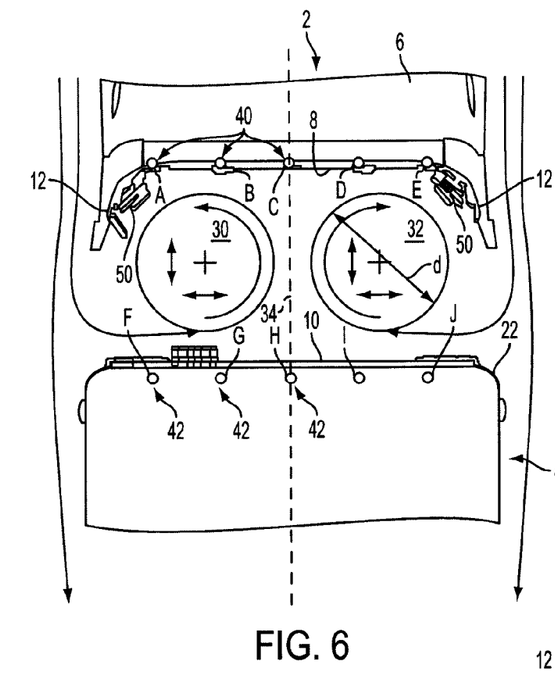
FIG. 6 is a top view of a truck and trailer showing exemplary vortices in the gap between the rear wall of the truck and the front wall of the trailer.

In another aspect, air pressure can be measured on specific surfaces of the vehicle and the measurements can be correlated, optionally using other measurements, such as ambient air pressure and temperature, to optimize aerodynamic drag. The specific measurement surfaces can be front portions of a trailer 4 and/or rear portions of a tractor 2 as shown in FIGS. 5 and 6, surfaces of the aerodynamic devices, and/or elsewhere on the vehicle. Using the air pressure measurements, the angles, positions, orientations, and/or other features of the aerodynamic devices can be adjusted, independently or otherwise, to result in a different air pressure measurement corresponding to improved and/or optimized drag for the current conditions.

In yet another aspect, wind speeds and wind directions can be measured at locations remote from the vehicle. Using the wind speed and wind direction measurements, the aerodynamic devices can be adjusted proactively or preset to desired states in anticipation of the vehicle encountering the measured winds to result in optimized drag for the expected conditions.

These aspects can be combined such that the anticipated preset state values refine and/or complement the dynamic feedback from pressure sensors and/or wind measurement apparatus with specific configuration data.

Optimal device configurations can be partially determined by certain vehicle characteristic dimensions, such as trailer height "H", width "W", length "L", trailer profile, and/or the gap distance "G" between the cab 6 and the trailer 4, such as shown in FIGS. 1-5. When a tractor 2 is connected to a trailer 4, the optimal configurations can change. Preset configurations can be selected for the trailer type and the gap size between the back 8 of the cab 6 and the front 10 of the trailer 4. Exemplary gaps can vary and can include 42", 46", 48", 50", 54" and/or 60". Shorter gaps are also contemplated. Exemplary trailer types can vary and can take on any form, such as a van, low bulk, flatbed, and/or container types. The configuration data associated with each combination of vehicle conditions can be stored, for example, in a look-up table or database. A user and/or a control system can use the database to adjust the aerodynamic devices to the corresponding preset configurations. For example, the angular position of side extenders and a roof spoiler, if present on a vehicle, can be stored for each type of trailer that a truck may tow (e.g., a high trailer, a flatbed trailer, a tanker trailer). Motors, cylinders, or other actuators can be operated to position the aerodynamic devices at the preset conditions for the trailer type being towed by the truck. These desired angular positions can be determined, for example, by measuring wind resistances in a wind tunnel. As another alternative, the distal edges of movable air deflectors can be set at selected initial positions. For example, the upper distal edge of a roof spoiler can be set at an elevation that is at, above or near the elevation of a trailer that is taller than the roof of the cab and at a stowed lower position if the trailer height is shorter than the cab. As another example, side extenders can be set such that the distal edges are spaced at, near or wider than the side of the trailer nearest to the distal edge when the longitudinal axes of the truck and trailer are aligned.

Take for example a truck or tractor 2 towing a rectangular trailer 4, as shown in FIGS. 1-6. The height and width of the trailer 4, along with the gap between the cab 6 and the trailer 4 can each correspond to different device adjustments. The height "H" (see FIGS. 1 and 2) of the trailer 4 can affect the setting for a roof spoiler (not shown), among other aerodynamic devices. For example, a taller trailer, as in FIG. 1, can correspond to a greater roof spoiler angle (where 0° is parallel to the road and 90° is perpendicular upward from the road) and a shorter trailer, as in FIG. 2, can correspond to a smaller spoiler angle. In some embodiments 0° can be a minimum, while in other embodiments, negative angles can be achieved. Negative spoiler angles can also be optimal, such as with a flatbed trailer.

Side extenders 12, or other side mounted aerodynamic devices, can be similarly adjusted relative to a trailer width "W" (see FIG. 5). A narrower trailer 4 can correspond to a smaller side extender angle (where 0° is parallel and opposite to the driving direction and 90° is perpendicularly outward), while a wider trailer can correspond to a greater side extender angle.

The top and side aerodynamic devices can also be adjusted relative to the gap "G" (see FIG. 5) between the back 8 of the cab 6 and the front 10 of the trailer 4. For example, a smaller gap, as shown in FIG. 3, can correspond to small device angles, and thus less air deflection, while a larger gap, as shown in FIG. 1, can correspond to greater device angles. This angle/gap relationship can be linearly or otherwise related. In one non-linear example, when the gap exceeds a certain size, the device angles can begin to decrease, such that if the gap is large enough, a 0° device angle is desirable.

The length of the aerodynamic devices can also be adjusted to optimize drag. For example, in some embodiments, the side extenders can be extended farther rearward to correspond to a larger cab-trailer gap.

Figure 7:
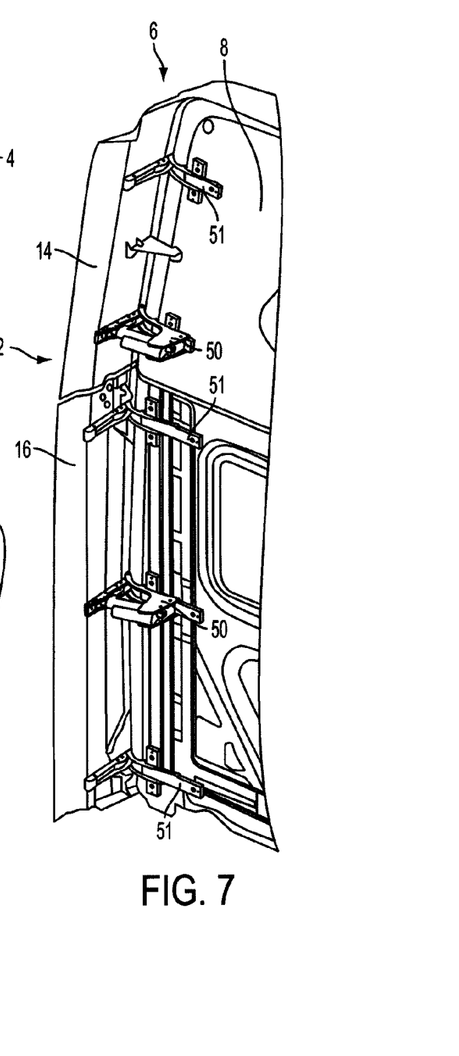
FIG. 7 is an enlarged view of an exemplary connection between a side extender and rear wall of a tractor that allows the adjustment of the angle of the side extender relative to the rear wall.

The aerodynamic devices can also comprise movable air deflector components such that each component can be set at a different angle. In the example shown in FIG. 7, a side extender 12 can comprise a top section 14 and a bottom section 16. Separately movable trim tabs, along the trailing edges of the side extenders and roof spoilers, can also be included. Each movable aerodynamic device air deflector component can be joined for simultaneous adjustment or can be separately movable for independent adjustment. With a taller trailer, as in FIG. 1, the two sections can be set at the same angle. In an independently adjustable embodiment, with a shorter trailer, as in FIG. 2, however, the top section 14 can be set at a smaller angle while the bottom section 16 can be set at a greater angle. This can result in greater air deflection around the trailer 4 and less air deflection above the trailer. These concepts can be applied to a roof mounted aerodynamic device in relation to a trailer. For example, a roof mounted aerodynamic device can comprise a mid-section and two end sections. The mid-section can be set to a greater angle to deflect air above a narrow trailer, while the end sections can be set to smaller angles to deflect less air on the sides of the trailer.

Figure 13:
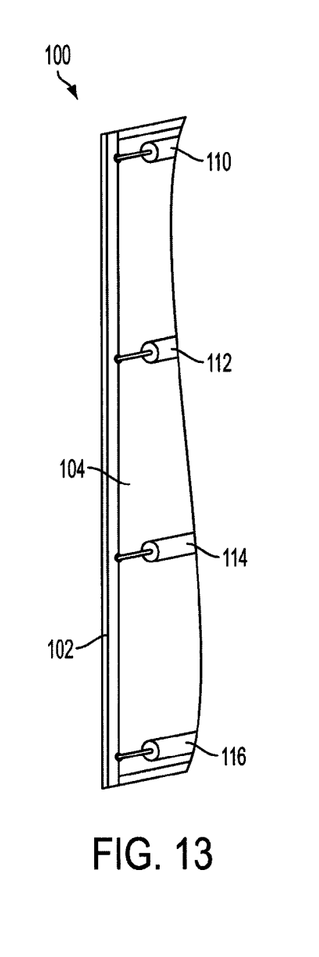
FIGS. 13-15 illustrate respective views of an embodiment of a side extender comprising a frame that can be distorted to adjust the configuration of the frame and thereby the configuration of a skin or covering mounted to the frame.
Figure 14:
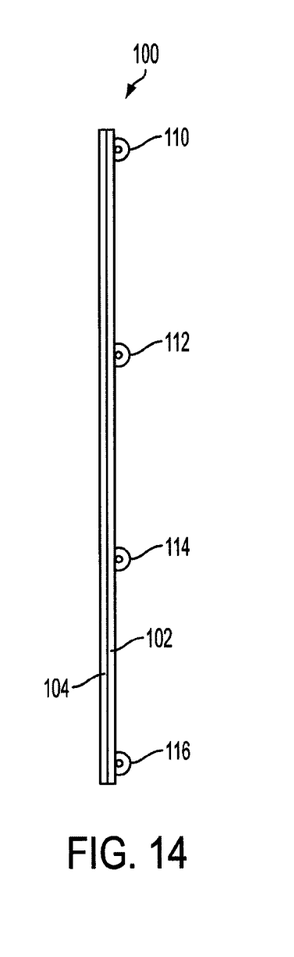
Figure 15:
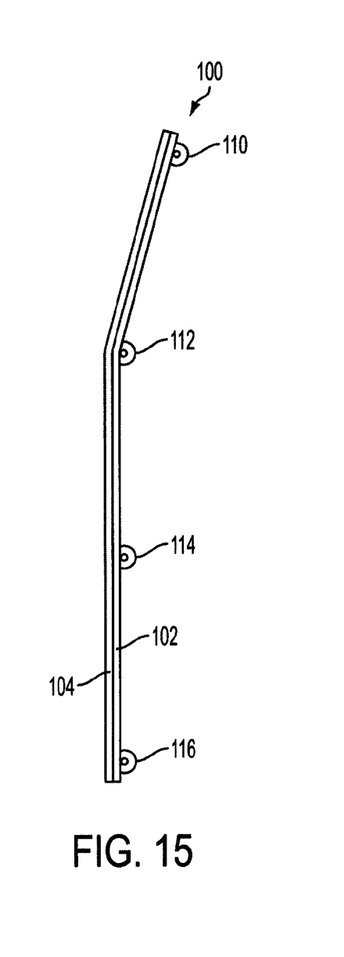

The aerodynamic devices can also be comprised of a flexible portion and/or entirely of a flexible material, such as a flexible skin or covering, and a plurality of independently adjustable elements connected to different portions of the flexible portion. For example, with reference to FIGS. 13, 14 and 15, an aerodynamic device 100 is shown, such as a portion of a side extender, comprising a frame 102 to which a covering or skin 104 is mounted or otherwise coupled. The covering 104 can be of a flexible or bendable material and can comprise a resilient material, such as a polymer material. A plurality of position adjusters are shown coupled to the frame. In this example, four actuating cylinders 110, 112, 114 and 116 are shown connected to the frame at vertically spaced apart locations. These actuating cylinders are also coupled to the rear wall of the cab of a tractor in one example. Extending the actuators simultaneously moves the air deflector portion of the side extender as a unit to adjust the angle between the rear wall of the tractor and the side extender. In contrast, moving the actuators differing amounts distorts or contorts the frame to in turn contort the skin or covering to achieve a desired shape. For example, in FIG. 15 the lower three actuators 112, 114 and 116 have been extended a first amount whereas the upper actuator 110 has been extended a lesser amount (or retracted). As a result, the frame 102 is distorted and the covering 104 is correspondingly shaped. The aerodynamic device can be contorted based on the shape, for example, of a towed trailer. Thus, in FIG. 15 assume that the towed trailer and/or load is narrower at the top than at the bottom. Thus, the angle of the skin 104 has been adjusted to more closely conform to the trailer and/or load shape. The actuators 110-116 can be hydraulic and/or pneumatic cylinders having a position controlled by a controller. Alternatively and more desirably the actuators can be electric motors, such as stepper motors, with the position of the motor indicating the position of the actuator and thereby the angular position of the air deflector portion of the aerodynamic device. A controller can provide drive signals to the motor to control the position of the air deflector of the aerodynamic device. In the embodiment of FIGS. 13-15, the movable air deflector portion comprises the skin. In effect, the frame 102 can be combined with the skin and the skin can be of material that is stiff enough to itself comprise the frame. In this manner, the flexible portion can be adjusted, or contorted (e.g., warped), to have different deflection angles at different locations.

A manual, semi-automatic, or automatic control system can, for example, use air pressure data, such as acquired from pressure sensors mounted at one or more locations. Exemplary mounting locations for air pressure sensors comprise the front vertical edges 22 of the trailer 4 (see sensors 20 in FIGS. 4 and 5), the front face 10 of the trailer 4 (see sensors 42 in FIG. 6), the back wall 8 of the cab 6 (see sensors 40 in FIG. 6), the aerodynamic devices themselves (not shown), and/or at other vehicle and/or trailer locations. The pressure sensors 20, 40, 42 can transmit data along wires and/or wirelessly. Pressure distributions across a plurality of sensors can be correlated with aerodynamic drag in the sensor area and/or for the whole vehicle. The adjustable aerodynamic devices can be angled and/or otherwise adjusted to target specific pressure distributions across a group of sensors or a sensor area.

The pressure measured at the front side edges 22 adjacent to the front 10 of the trailer 4 can be particularly relevant to drag. The flow of air coming off of side extenders 12 and trim tabs can split along the edges 22, as shown in FIG. 6, and create a region of varying pressures with static airflow and/or dynamic airflow. The air pressure at these edges 22 can be measured by one or more sensors 20 in one or more one-dimensional, two-dimensional, and/or three-dimensional arrays. For example, a two-dimensional array of pressure sensors 20 could be aligned horizontally around the corner of an edge or corner 22 at a certain height, such as shown in FIG. 4. A one-dimensional array could be aligned vertically along an edge or corner 22, for example. In another example, a three-dimensional array of pressure sensors can include pressure sensors positioned around the corner of edge 22 (which can be in respective horizontal planes) and positioned along a portion of the height of the edge, such as in vertical alignment in one or more vertical planes or other distributions along the entire vertical edge or portions thereof.

Figure 5A:
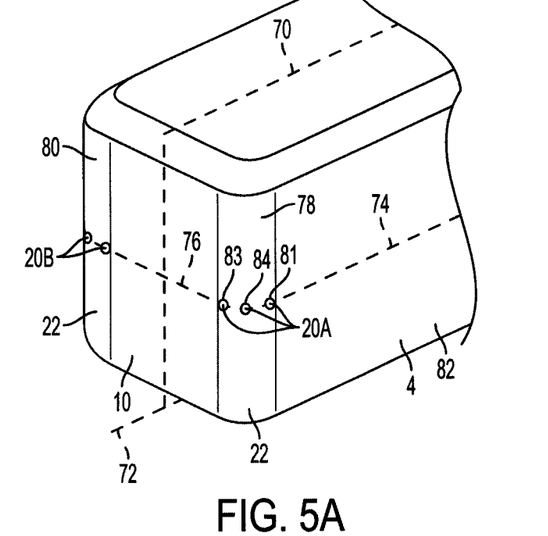
FIGS. 5A-5D are front perspective views of exemplary trailers showing exemplary locations for pressure sensors on or adjacent to the front surface of the trailers.

Exemplary locations of pressure sensors on or adjacent to the front surface 10 of a trailer 4 are shown in FIGS. 5A-5D. In FIG. 5A the dashed lines 70 correspond to a vertical plane through the longitudinal center line of the trailer 4. An extension of this plane along line 72 would pass through the longitudinal center line of a truck tractor if the tractor and trailer are being towed straight along a roadway. In FIG. 5A, the lines 74, 76 are in a horizontal plane passing through the trailer 4. In the embodiment of FIG. 5A, the array of pressure sensors comprises first and second sets of plural pressure sensors in a common horizontal plane. The first set of pressure sensors 20A is shown positioned adjacent to the first corner 78 of the trailer. In addition, the second set of pressure sensors 20B is shown positioned adjacent to the second corner 80 of the trailer. The illustrated sets of pressure sensors 20A, 20B can have more or fewer pressure sensors than shown in FIG. 5A, although each of the exemplary sets in FIG. 5A consists of three such pressure sensors. In the FIG. 5A embodiment, set 20A includes a first pressure sensor 81 adjacent to a first side 82 of the trailer, a second pressure sensor 83 positioned at the front of the trailer adjacent to the first corner and a third pressure sensor positioned intermediate to the first and second pressure sensors, such as substantially at the corner of the trailer. Set 20B can consist of a similar set of three pressure sensors. Each of the pressure sensors provides a pressure indicating output signal. The use of a plurality of sensors at each of the corners enables a controller to determine a pressure gradient across the pressure sensors of the respective sets and thus in this example about the corner of the trailer. By comparing the pressure gradient across one corner to the pressure gradient across the other corner a controller can use this information to control air deflector portions of aerodynamic devices to adjust the gradients as desired. For example, the pressure gradients can be adjusted to minimize the pressure at the forward most pressure sensor. The use of a plurality of sensors provides a more accurate pressure sensor measurement.

Figure 5B:
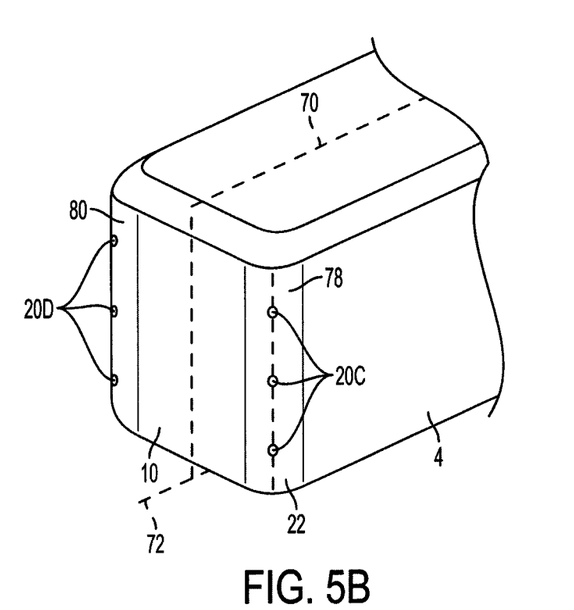
Figure 5C:
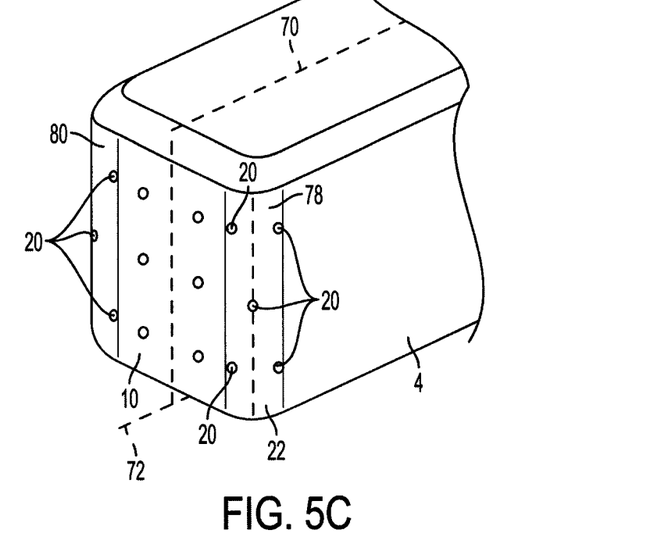

In the example of FIG. 5B, an array of sensors comprises a set of sensors 20C comprising a plurality of pressure sensors aligned in a vertical line at the corner 78 of the trailer. In addition, another set of plural sensors 20D are aligned in a vertical line along the corner 80 of the trailer. The sets of pressure sensors 20C, 20D provide an indication of upward and downward variations in pressure along the trailer surface at the corners thereof. In the embodiment of FIG. 5C, a plurality of pressure sensors are shown toward the front surface 10 and corners 78, 80 of the trailer at varying heights and transverse spacings, such as transverse spacings from the vertical center line 70 of the trailer. A plurality of these pressure sensors can be aligned in a common horizontal plane with sensors being distributed in a plurality of common horizontal planes in FIG. 5C. In addition, plural sensors can be aligned in common vertical planes as well. It should be noted that the sensors need not be oriented in common horizontal and common vertical planes.

Figure 5D:
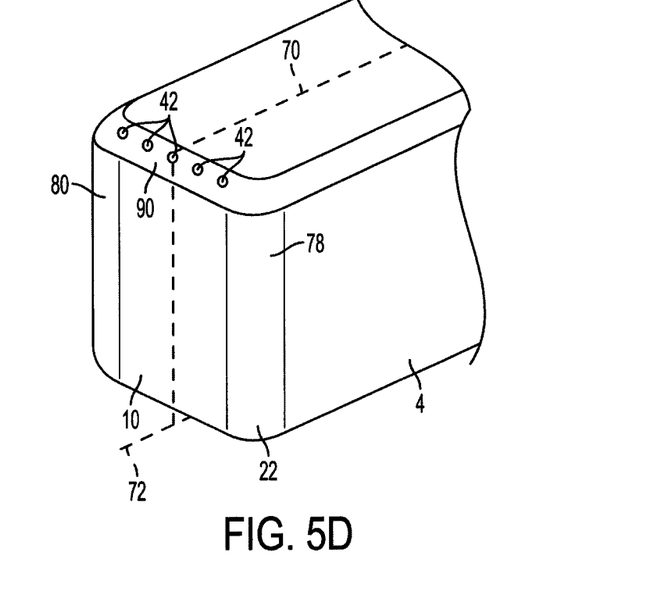
Figure 12:
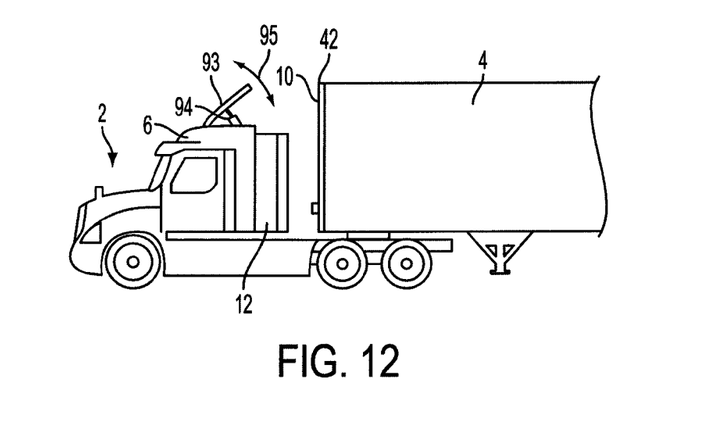
FIG. 12 illustrates a truck and trailer with one side extender being shown and a roof spoiler.

In the embodiment of 5D, a set of sensors 42 are shown across an upper corner 90 of the trailer 4. These sensors can, for example, be used in controlling the adjustment of a roof spoiler mounted to a tractor towing the trailer. For example, the roof spoiler position can be adjusted to achieve a common low pressure across the sensors 42. For example, in FIG. 12 a roof spoiler 93 is shown that is adjustable by an actuator 94 in the directions indicated by arrows 95 to thereby adjust the deflection of air upwardly and downwardly from the spoiler 93. The position of the spoiler can be adjusted to reduce the pressure at sensors 42 on the front surface of the trailer 4. Thus, for example, if a driver forgets to manually adjust or cause the adjustment of the position of the roofs spoiler, a controller in response to pressure signals from sensors 42 can control actuator 94 to raise the spoiler 93 to reduce the pressure indicated by the pressure output signals from the sensors 42. Similarly, in the absence of pressure output signals from pressure sensors 42 (for example, of no trailer is being towed) this lack of signals can be detected and used by the controller to control the actuator 94 to lower the spoiler 93 if, for example, the driver forgets to lower or cause the lowering of the spoiler after a trailer is dropped off.

An alternative method of measuring drag can include indirectly measuring the positions and sizes of vortices 30, 32 between the tractor 2 and a trailer 4, such as shown in the example of FIG. 6. Under certain conditions, two such vortices can form, side-by-side, in this gap. The lowest overall aerodynamic drag on the vehicle can be correlated to when the two vortices are evenly sized (e.g., the same diameter "d") and evenly positioned, both with respect to center line 34 and with respect to the back 8 of the cab 6.

With reference to FIG. 6, the size and position of the vortices 30, 33 can be measured using pressure sensors 40 on the back 8 of the cab 6 and/or the pressure sensors 42 on the front 10 of the trailer 4. For example, the diameter of vortex 30 can be measured by comparing the pressure differences between sensors A, B and C (FIG. 6). Greater differences, for example, can indicate a smaller diameter. Alternatively, or in addition, the average pressure of sensors B and G (if trailer sensors are also used) can be used to determine the diameter of vortex 30. The fore-aft position of vortex 30 can be measured, for example, by the respective differences between the readings from sensors A, B and C, and the readings from sensors F, G and H. Higher pressures at A, B and C can indicate the vortex 30 is closer to the cab than the trailer. The side-to-side position of vortex 30 can be measured, for example, by the difference between the sensors A and C and/or between F and H. For example, a higher reading at sensor A than at sensor C can indicate the vortex 30 is positioned closer to sensor A than to sensor C. Similar measurements can be made in relation to vortex 32, and thus the relation between the two vortices can also be measured. It should be noted that some or all of these vortex measurements can optionally be accomplished with only the pressure sensors 40 on the back 8 of the cab 6.

This data regarding the size and position of the vortices 30, 32 can be used to adjust the aerodynamic devices to reposition the vortices and reduce drag. For example, adjusting the left side extender 12 outward can reposition one or both of the vortices 30, 32 leftward and/or can decrease the size of one or both of the vortices, thereby changing vehicle drag.

Figure 8:
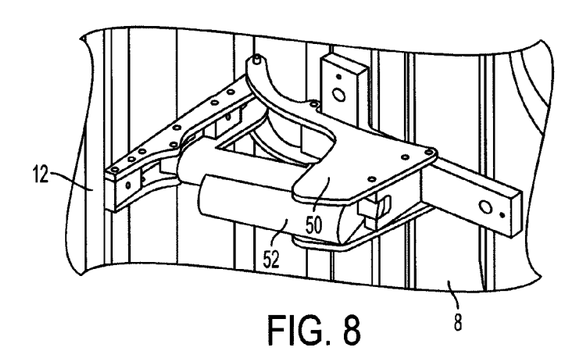
FIG. 8 is a perspective view of an exemplary side extender having upper and lower portions with the respective upper and lower portions each being provided with a respective position adjuster.

Each aerodynamic device can have one or more actuation mechanisms, such as the actuation mechanism 50 shown in FIG. 8, comprising at least one actuator 52. The actuator 52 can be powered by any means, such as for example manually, electrically, pneumatically, mechanically, and/or hydraulically. Each actuator 52 can be independently controlled by the control system to address each aerodynamic device individually to improve drag characteristics at the adjacent portions of the vehicle. Individual aerodynamic devices can also have more than one independently controlled actuator 52. For example, the shape of flexible aerodynamic devices can be warped or contorted such that one portion is actuated to a different angle than another portion. Warpable aerodynamic devices can comprise a skin or cover comprised of, for example, an elastic material, a polymer material, sheet metal material, and/or fabric material. One cab-height warpable side extender can be used to replace a two-part side extender, such as the top and bottom side extenders 14, 16 in FIG. 7. In one example, the control system of a tractor 2 having such a warpable side extender and towing a short trailer 4, such as in FIG. 2, can warp the side extender such that the top portion of the warpable side extender is at a smaller angle while the bottom portion is at a greater angle (see, for example, FIG. 15).

Figure 9:
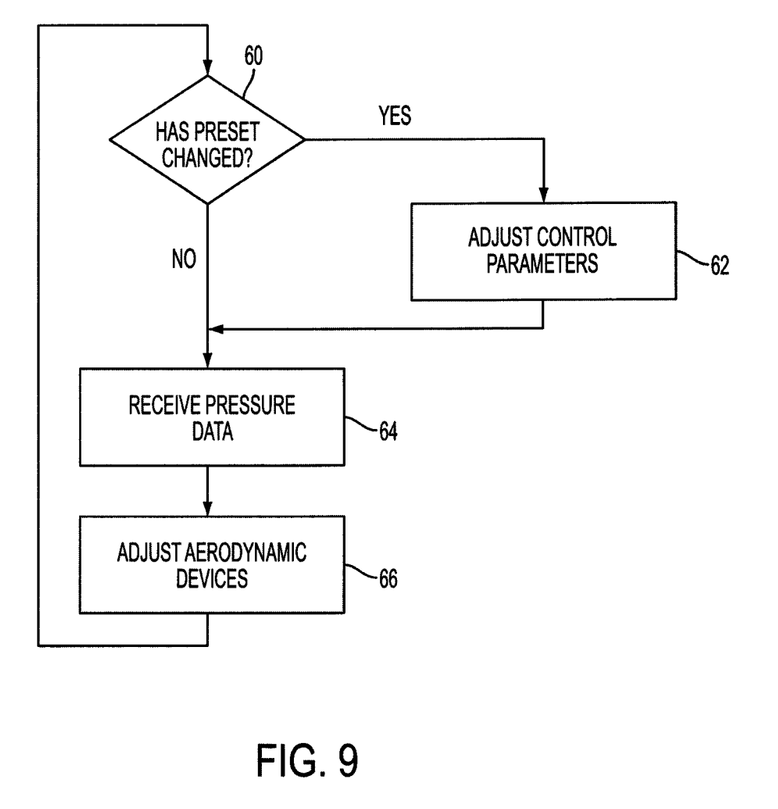
FIG. 9 is an exemplary flow chart illustrating one method of controlling the position of aerodynamic devices such as the side extenders.

The method of presetting specific aerodynamic device configurations for specific trailers can be combined with the method of measuring pressures across an array of pressure sensors. In such a hybrid system, the preset settings can prime or preset the control system to the optimal device settings and then the control system can adjust the settings based on the pressure readings. As shown in the flow chart in FIG. 9, if the preset is changed 60, such is when a different trailer is connected to the tractor, the control system can adjust control parameters 62 to the new preset. The control system can then receive pressure data 64 from the pressure sensors and further adjust the aerodynamic devices 66 to optimize drag.

Aerodynamic vehicle devices can also be adjusted based on measured wind speeds and/or wind directions. A vehicle can include an apparatus for measuring the speed and/or direction of wind (air) at one or more locations remote from the vehicle.

Based on such measurements, the aerodynamic devices can be proactively and/or predictively adjusted prior to the vehicle encountering the upcoming wind conditions. Such predictive measurement and adjustment can allow for greater optimization of aerodynamic drag. The air motion measuring apparatus, or air meter, can also be used to generate a database of measurements from which a running average of wind conditions can be calculated and used in adjusting vehicle aerodynamic devices.

The air meter can comprise any suitable ranged wind motion detection technology, with one desirable embodiment comprising a laser meter. An exemplary laser meter can use fiber optics to project one or more laser beams in a direction of desired measurement and measure the velocity of the air at a desired location by detecting reflections of the projected laser beams that return to the laser meter. In some embodiments, the projected laser beams can be pulsed at certain frequencies to enhance wind speed measurement.

Some laser meter embodiments can be mounted to a surface of the vehicle, such as on the roof of the cab. These embodiments can have no moving parts, can be waterproof, and can be operable over a range of ambient temperatures. Exemplary suitable commercially available laser meters include Vindicator®, Windseeker Xtreme™, and Racer's Edge® brand laser wind sensors from Catch the Wind, Inc.

The air meter can measure the speed and direction of air (wind) at one or more locations as three dimensional vectors. The air meter can simultaneously measure wind (air) speed and direction at several different locations. In one example, the air meter can simultaneously measure air motion at multiple points along vertical or horizontal lines. In another example, the air meter can simultaneously measure air motion at multiple points at different distances in the same direction in relation to the air meter. In yet other examples, the air meter can measure air motion at multiple points across two or three dimensional fields. Measuring wind at plural locations simultaneously can provide data that allows the determination of at least one of the air acceleration as well as wind shear. The air deflectors of aerodynamic devices can be adjusted to counter changes in wind shear and wind acceleration.

The air meter can have a maximum and/or a minimum range at which air measurements are desirably taken. In one example, the measurements by an air meter can be taken at least up to 1,000 meters. In another example, the measurements are taken at least up to 300 meters.

The air meter can have a maximum horizontal and/or vertical angle of measurement relative to a fixed centered or longitudinal axial direction. For example, the air meter can be mounted to a vehicle surface such that (when the vehicle is horizontal on a horizontal road surface) the air meter is aimed in a centered direction that is straight ahead of the vehicle and parallel to both the road and longitudinal axis of the vehicle. In this example, the air meter may be used for taking measurements at a certain maximum angle to the left or right of the centered direction, and at a another maximum angle above or below the centered direction, thereby forming a generally conical sector of measurable space. In other embodiments, the air meter can be adjustably mounted to the vehicle such that the direction of aiming the air meter can be adjusted, thereby allowing the air meter to measure air motion in a greater range of directions. More than one air meter can also be used on a vehicle, for example to measure air motion in opposing directions.

In some situations, it can be useful to measure the air motion downroad from the vehicle in the direction the vehicle is traveling in order to anticipate the air conditions the vehicle is soon to encounter. In other situations, it may be desirable to measure air motion to either side of the vehicle, above the vehicle, or behind the vehicle. For example, it can be useful to measure air motion to either side of the vehicle in order to anticipate crosswinds approaching the vehicle at an angle transverse to the driving direction.

Some air meter embodiments can take air motion measurement over a range of frequencies. In one example, the air meter can take measurements at a frequency of one Hertz, or once every second. In other embodiments, the air meter can take measurements at higher frequencies, lower frequencies, periodically or at irregular intervals.

The air meter can measure and transmit air motion measurements to a computer, such as an onboard or a remote computer, using wired or wireless communication systems. The computer can use the air motion data to calculate optimal adjustments for the aerodynamic devices and transmit that information to the system controller to make the adjustments prior to the vehicle encountering the measured locations. For example, for a measurement taken 300 meters ahead of a vehicle traveling at 60 mph, the computer and control system will have about 11 seconds to process the measurement data and adjust the aerodynamic devices before the vehicle gets to the measurement location, and for a measurement taken 1,000 meters ahead, the system will have about 37 seconds to make adjustments. Such real-time, predictive adjustments can be particularly useful to anticipate rapidly changing air motions. For example, the system controller can proactively shift aerodynamic panel angles in preparation for a high wind gust traveling rapidly toward the vehicle in an unexpected direction.

The air motion measurements can be made more accurate by considering the motion of the vehicle. For example, the air meter may only measure the motion of the air relative to the vehicle. In this case, the velocity of the vehicle can be subtracted from the measured air velocity to obtain a true air velocity value. The motion of the vehicle can be measured in various manners, including conventional speedometer and compass measurements, or via a Global Positioning System (GPS). A GPS system can be included as part of the air meter or as a separate component of the vehicle. GPS data and air motion measurements can be factored together to more accurately measure the true motion of the air independent of the vehicle.

An air motion meter can also be used to generate a running average of wind speed and wind direction over time. The running averages can be used to approximate the most probable wind conditions that the vehicle will encounter in the future. The aerodynamic devices can be adjusted based on the expected average wind conditions to optimize aerodynamic drag on the vehicle.

In one example, the air meter can measure the speed and direction of the wind at a distance (e.g., 300 meters) ahead of the vehicle at a frequency (e.g., once every second). The most recent measurements (e.g., the last 60 measurements) can be averaged to generate an average wind speed and wind direction over that period of time (e.g., over the immediately preceding minute). The aerodynamic devices can then be adjusted based on the assumption that the wind speeds and wind directions encountered by the vehicle over the next period will be like the measured averages over the previous period. This process can be repeated, adjusting the aerodynamic devices once per period based on the average wind conditions over the previous period.

In another example, a continuous running average can be used to continuously adjust the aerodynamic devices. In this example, the average wind conditions over a desired period of time can be continuously recalculated each time a new measurement is taken by the air meter. For example, assume that an air meter takes air motion measurements once every second. In this example the running average can be recalculated, for example, once every second. The aerodynamic devices can, for example, be readjusted every second based on the latest calculation. However, adjustments will typically be made at longer time intervals. The control system can be programmed to only adjust the aerodynamic devices when the running averages exceed threshold values. For example, the threshold values can be set at 10 mph increments for wind speed or 45° increments for wind direction. Using threshold values can reduce the number of adjustments made and thereby reduce wear and energy costs.

Measurements from the air meter can be stored in a database and correlated with contemporaneous situational information, such as vehicle location, time of day, date, ambient air temperature, etc. This stored data can be used to create a database for future prediction of wind conditions. For example, for a vehicle making repetitive trips at the same time each day, the aerodynamic devices can be predictively adjusted based on the measured wind conditions at the same location and the same time the previous day, or based on an average of the measured wind conditions at that location and time over the last several days. This database of wind condition information can also be wirelessly transmitted and shared with other vehicles, such as vehicles that travel the same routes.

Figure 10:
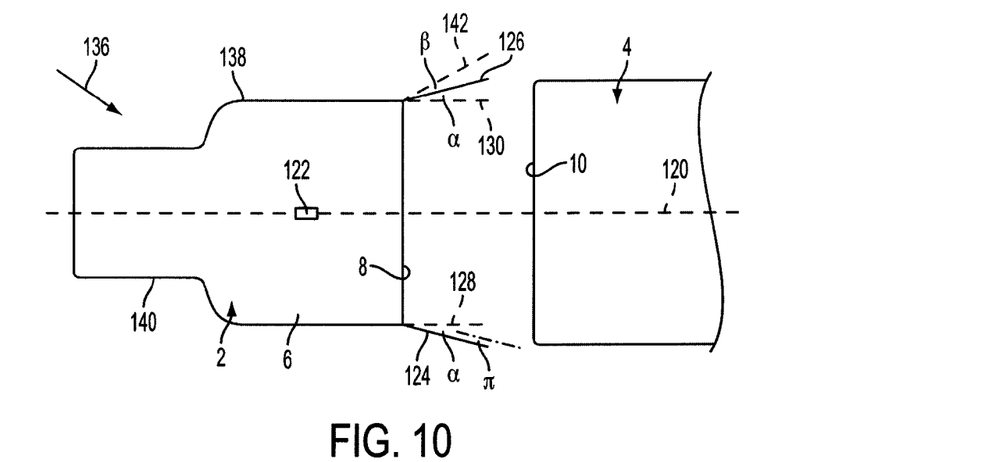
FIG. 10 is a top view, in schematic form, of a truck and front portion of a trailer with first and second side extenders and showing an exemplary wind speed and angle measurer mounted to the truck.
Figure 11:
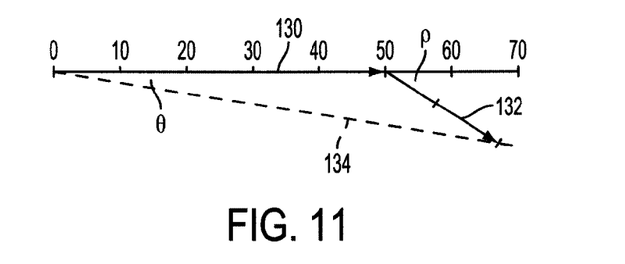
FIG. 11 is a vector diagram showing the summation of wind speed from vehicle travel in the direction of the longitudinal axis of the truck tractor summed with a vector of wind coming from the upper left in FIG. 10.

For purposes of further clarification of exemplary air meter embodiments of this disclosure, reference is made to FIGS. 10 and 11. In FIG. 10, a truck 2 is shown with a cab 6 and rear wall 8. In addition, a trailer 4 is shown with a front wall 10. The longitudinal axis of the truck and trailer is indicated by the number 120 when the truck and trailer are traveling straight down the highway. An air meter, such as a laser air meter 122 is shown mounted to the roof of the cab 6 along the longitudinal center line 120 of the vehicle, although other mounting locations can be used. First and second adjustable side extenders 124, 126 are also shown in FIG. 10. Under a first set of travel conditions, the angle of the respective side extenders 124, 126 relative to planes or lines 128, 130 parallel to the longitudinal axis 120 is indicated to be the same in this example, namely $\alpha$. Assume for purposes of discussion that the vehicle is traveling at 50 miles per hour along a straight section of the highway and that the wind is calm. A wind vector 130, shown in FIG. 11, corresponds to the effective wind on the vehicle when traveling at this speed. Assume that the air meter 122 detects upcoming wind of twenty miles per hour at an angle $\rho$ with respect to the line 120. The vector for this wind is indicated at 132 in FIG. 11 with the resultant wind vector, corresponding to the sum of vectors 130 and 132, being indicated by vector 134 in FIG. 11.

Thus, the expected wind when encountered will be traveling generally in the direction indicated by arrow 136 in FIG. 10 with the windward side of the vehicle being indicated at 138 and the leeward side of the vehicle being indicated at 140. In response to a wind indicating output signal from air meter 122 indicating the speed and direction of the expected wind, the position of the first and second air deflectors 124, 126 can be adjusted. Also, the air meter 122 can provide plural wind indicating output signals each corresponding to a measurement of the speed and direction of the motion of air at a different location from which the wind shear and acceleration of air can be determined and used in adjusting the position of the aerodynamic devices. More specifically, in response to wind determined along line 136, the air deflector 126 can be moved through an angle $\beta$ to a new position indicated at 142 to provide a greater wind shadow at the front of the trailer 10 to counter the upcoming wind. In addition, the air deflector 124 can be moved in the same direction as air deflector 126 through, for example, an angle $\beta$. However, because air deflector 124 is at the leeward side of the vehicle, it is typically moved an angle $\pi$ which is less than the angle $\beta$. Thus, in one example, the side extender air deflector at the windward side of the vehicle is moved to a greater extent than the side extender at the leeward side of the vehicle, although desirably both of the air deflectors of the side extenders are moved in the same direction. In moving from angle $\alpha$ through an additional angle $\beta$ the angle between the side extender and the plane or line or plane 130 is increased. In addition, in moving through the angle $\pi$, the angle between the line or plane 128 and side extender 124 is decreased.

Wind speed and wind direction data can also be used in conjunction with air pressure data received from air pressure sensors on the vehicle, as described above, to optimize aerodynamic drag on the vehicle. The combination of air pressure information at surface locations on the vehicle and/or trailer and wind condition information at locations remote from the vehicle can provide a more comprehensive picture of the environment and allow the aerodynamic devices to be more optimally adjusted. Alternatively, the wind condition information can be used instead of air pressure information in controlling the aerodynamic devices.

Figure 16:
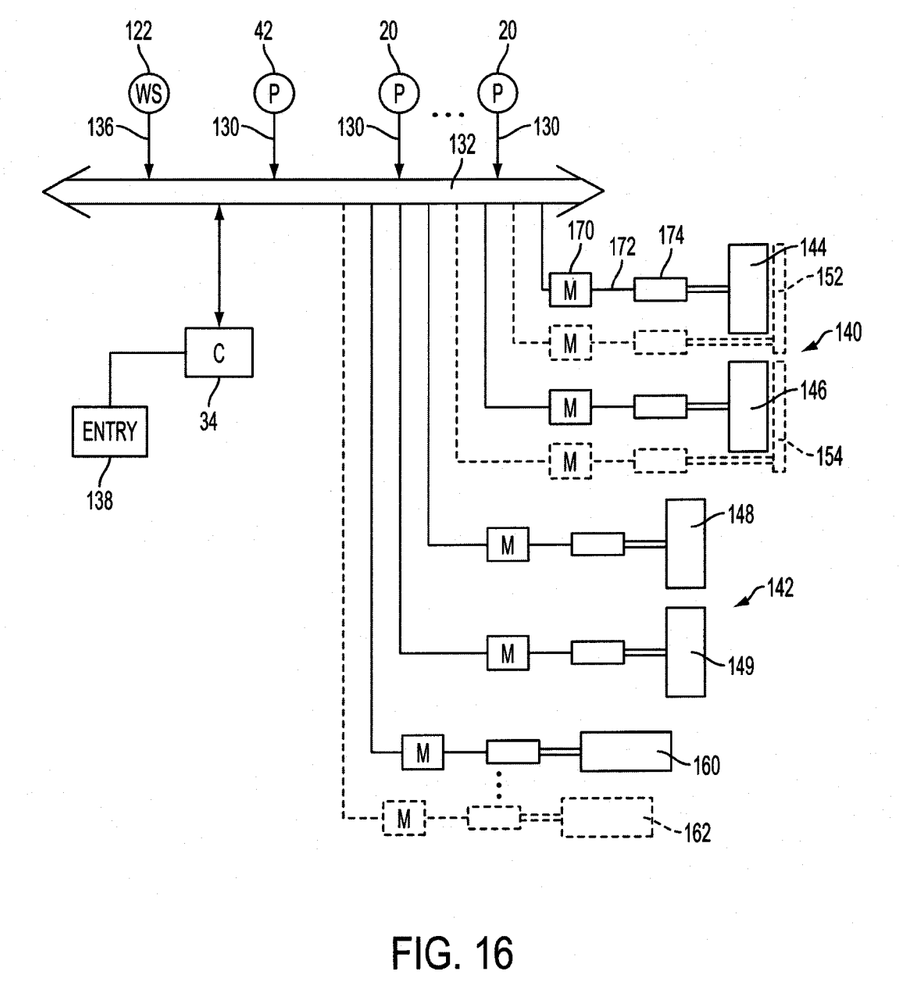
FIG. 16 is a schematic illustration of an exemplary deflector adjuster for adjusting the movable portions of aerodynamic devices included in a vehicle.

One exemplary form of air deflector adjuster is illustrated in FIG. 16. In FIG. 16, a plurality of air pressure sensors 20 and 42 are schematically shown having respective pressure signal outputs 130 coupled to a data bus 132 that carries these pressure signals to a controller 134 that is also coupled to the data bus. Vehicle data buses for carrying respective sensor signals are known. The signals on lines 130 can be adjusted by signal drivers as is well known for compatibility with the data bus. In addition, in the embodiment of FIG. 16, a wind sensor 122 is shown coupled by a line 136 to the data bus to provide wind data to the controller. A keypad, touchpad or other data entry device 138 (which can be wireless), is shown coupled to the controller 134 for use in programming the controller. The controller can include, or be coupled to, memory storing look up tables and other data for use by the controller in controlling the aerodynamic devices and more specifically the movable air deflector portions of such devices.

Exemplary aerodynamic devices with movable air deflectors are shown in FIG. 16. These comprise, for example, first and second side extenders 140, 142. In this example, side extender 140 comprises upper and lower side extension portions 144, 146 which are independently movable. In addition, side extender 142 comprises respective upper and lower side extender portions 148, 149 which are also independently movable. Side extender 140 is also shown with optional upper and lower trim tab portions 152, 154 with trim tab 152 being, for example, pivotally coupled to movable side extender portion 144 and trim tab 154, for example, being pivotally coupled to the movable side extender portion 146. Similar trim tabs can be provided for side extender sections 148, 149 of side extender 142 as well. In addition, other aerodynamic devices are shown schematically in FIG. 16, such as a roof spoiler 116 with a movable air deflector portion and a side faring 162. Each of the movable air deflector portions of the aerodynamic devices is moved in response to signals from the controller 134 that control an actuator coupled to the vehicle, such as to the rear wall of the cab of the vehicle, and the movable air deflector portion. Although different actuators can be used for the different aerodynamic devices, the same type of actuator can be used for each aerodynamic device. Thus, only an exemplary actuator for upper side extender portion 144 will be described in detail. More specifically, the actuator for the air deflector portion 144 of side extender 140 comprises a motor 170 that rotates to move a motor output shaft 172 to adjust the position of an actuator 174, such as a jackscrew or other actuator, to adjust the position of the air deflector portion 144 of the side extender 140. The motor 170 can comprise a stepper motor of the type that locks into the position to which it has been moved until it is again moved. The feedback from the motor can be provided to the controller to indicate the motor position and thus the corresponding position of the air deflector portion 144. It is of course to be understood that other actuators such as previously described can be used instead of electric motors. For example, the controller can control valves that control the flow of hydraulic fluid or pneumatic air to actuating of cylinders.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A vehicle comprising:
    a cab comprising a rear wall;
    at least one adjustable aerodynamic device coupled to the cab and comprising at least one movable air deflector portion movable relative to the cab to vary the air pressure behind the rear wall in response to movement of the air deflector;
    a deflector adjuster coupled to the air deflector portion and comprising at least one input for receiving pressure signals from pressure sensors that measure the pressure rearwardly of the rear wall of the cab, the deflector adjuster being responsive to the pressure signals to adjust the position of the air deflector portion relative to the rear wall of the cab in response to the pressure signals to adjust the pressure behind the rear wall and thereby adjust the drag on the vehicle;
    a tractor supporting the cab and a trailer coupled to the tractor for towing by the tractor, the trailer including a front surface;
    the pressure sensors comprising at least one array of trailer supported pressure sensors coupled to a front surface of the trailer with each pressure sensor being operable to measure the pressure of air adjacent to the location of the pressure sensor and to produce a pressure signal corresponding to the measured pressure, at least two of the pressure sensors being coupled to the front wall of the trailer on opposite sides of the longitudinal center line of the trailer; and
    the deflector adjuster being responsive to the pressure signals from the array of pressure sensors to adjust the movable air deflector portion.

2. The vehicle of claim 1, further comprising at least one pressure sensor coupled to the rear wall of the cab.

3. The vehicle of claim 1, wherein the front wall of the trailer has first and second corners and the array of pressure sensors comprises first and second sets of plural pressure sensors in a common horizontal plane with the first set of pressure sensors being adjacent to the first corner and the second set of pressure sensors being adjacent to the second corner.

4. A vehicle according to claim 3, wherein the first set of pressure sensors comprises a first pressure sensor positioned adjacent to a respective side of the trailer adjacent to the first corner, a second pressure sensor positioned at the front of the trailer adjacent to the first corner and a third pressure sensor positioned intermediate to the first and second pressure sensors adjacent to the first corner; and wherein the second set of pressure sensors comprises a first pressure sensor positioned adjacent to the side of the trailer adjacent to the second corner, a second pressure sensor positioned at the front of the trailer adjacent to the second corner and a third pressure sensor positioned intermediate to the first and second sensors adjacent to the second corner.

5. The vehicle of claim 3, wherein the deflector adjuster comprises a controller operable to determine a pressure distribution gradient across the respective sets of pressure sensors.

6. The vehicle of claim 1, wherein the array of pressure sensors comprise plural pressure sensors coupled to the front of the trailer with at least some of the pressure sensors being at different elevations and at different transverse spacings.

7. The vehicle of claim 1, wherein the array of sensors comprises plural pressure sensors in a common vertical plane intersecting the longitudinal center line of the trailer.

8. The vehicle of claim 1, wherein the air deflector adjuster is operable to adjust at least one of the aerodynamic devices while the vehicle is traveling in response to changing air pressure measurements by the pressure sensors.

9. The vehicle of claim 1, comprising pressure sensors coupled to the rear wall, the pressure sensors coupled to the rear wall and the pressure sensors of the array being positioned such that the air deflector adjuster is operable to determine the position and magnitude of one or more vortices located in a gap between a front of the trailer and rear wall of the tractor.

10. The vehicle of claim 9, wherein the at least one aerodynamic device comprises first and second side extenders, the air deflector adjuster being operable to adjust the first and second side extenders to adjust the magnitudes of the vortices relative to one another and the positions of the vortices relative to the tractor and trailer.

11. The vehicle of claim 10, wherein the array of pressure sensors further comprises a plurality of pressure sensors positioned across a rear surface of the tractor and a plurality of pressure sensors positioned across the front surface of the trailer and wherein the air deflector adjuster is operable to determine and the adjust fore-aft positioning of the vortices between the front surface of the trailer and rear surface of the tractor and is also operable to determine and adjust the side-to-side positioning of the vortices.

12. A vehicle comprising:
    a cab comprising a rear wall;
    at least one adjustable aerodynamic device coupled to the cab and comprising at least one movable air deflector portion movable relative to the cab to vary the air pressure behind the rear wall in response to movement of the air deflector; and
    an air deflector adjuster coupled to the movable air deflector portion and comprising at least one input for receiving pressure indicating signals from pressure sensors that measure the pressure rearwardly of the rear wall of the cab, the air deflector adjuster being responsive to the pressure indicating signals to adjust the position of the air deflector portion relative to the rear wall of the cab in response to the pressure signals to adjust the pressure behind the rear wall and thereby adjust the drag on the vehicle;
    wherein the movable air deflector portion comprises a deformable frame supporting a skin, the deformable frame being distorted by the air deflector adjuster to deform the frame to contort the skin to thereby move the air deflector portion.

13. The vehicle of claim 12, wherein the skin comprises a resilient material.

14. The vehicle of claim 12, wherein the deformable frame is deformed to contort the skin based on the cross-sectional shape of the trailer.

15. A vehicle comprising;
a cab comprising a rear wall;
a first side extender projecting rearwardly from the cab with at least a portion of the first side extender projecting rearwardly of the rear wall at a first side of the longitudinal axis of the cab, a second side extender projecting rearwardly from the cab with at least a portion of the second side extender projecting rearwardly of the rear wall of the cab at a second side of the longitudinal axis of the cab opposite to the first side of the longitudinal axis, the first side extender comprising a respective first movable air deflector portion and the second side extender comprising a second movable air deflector portion;
an air deflector position controller coupled to the first and second air deflector portions and being operable to control the positions of the first and second air deflector portions;
plural pressure sensors positioned to sense pressures between the cab and the front wall of a trailer upon towing of the trailer by the cab, the pressure sensors providing pressure signals indicating the location of first and second wind vortices that are established between the rear wall of the cab and front wall of the trailer as the cab travels in a forward direction at sufficient speed to generate the wind vortices; and
the air deflector position controller being operable to control the position of the first and second air deflectors to adjust the position of the vortices in response to the pressure signals.

16. A vehicle according to claim 15, wherein the air deflector position controller adjusts the positions of the first and second air deflectors in response to pressure signals to cause the vortices to be positioned on opposite sides of the longitudinal center line of the cab.

17. A vehicle according to claim 16, wherein the air deflector position controller adjusts the positions of the first and second air deflectors in response to pressure signals to cause the vortices to be positioned substantially the same distance from the longitudinal center line of the cab and substantially the same distance from the rear wall of the cab and the front wall of the towed trailer.

18. A vehicle according to claim 17, wherein the air deflector position controller adjusts the positions of the first and second air deflectors in response to signals to adjust the size of the vortices to be substantially the same.

19. A vehicle according to claim 15, wherein the air deflector position controller adjusts the positions of the first and second air deflectors in response to pressure signals to adjust the size of the vortices in response to pressure signals to be substantially the same.

20. A vehicle according to claim 15 in combination with a towed trailer.

21. A vehicle comprising:
a first side extender coupled to the vehicle and comprising a first air deflector;
a second side extender coupled to the vehicle and comprising a second air deflector;
an air motion sensor coupled to the vehicle, the air motion sensor being operable to measure the speed and direction of wind at a location remote from the vehicle, the air motion sensor having an output at which at least one wind indicating output signal is provided that indicates the wind speed and direction;
a control system coupled in signal communication with the first and second side extenders and the air motion sensor, the control system being operable to adjust the position of the first and second air deflectors in response to the at least one wind indicating output signal and thereby based on the measured remote air motion;
wherein the control system is operable to shift one of the first and second air deflectors at the windward side of the vehicle outwardly to increase the angle between the air deflector and a line parallel to the longitudinal center line of the vehicle in response to an increase in measured wind speed.

22. The vehicle of claim 21, wherein the control system is operable to shift the one of the first and second air deflectors at the leeward side of the vehicle inwardly to decrease the angle between the air deflector and a line parallel to the longitudinal center line of the vehicle in response to an increase in the wind speed at the windward side of the vehicle.

23. The vehicle of claim 22, wherein the control system is operative to adjust the angle of the air deflector at the windward side of the vehicle to a greater extent than the angle of the air deflector at the leeward side of the vehicle in response to an increase in wind speed.

24. A trailer comprising:
a front wall;
a plurality of pressure sensors coupled to the front wall of the trailer; and
the pressure sensors comprising first and second sets of plural sensors at each side of the longitudinal center line of the trailer, one such set of sensors being positioned adjacent to a first front corner of the trailer and a second such set of sensors being positioned adjacent to a second front corner of the trailer.

25. A method comprising:
setting one or more aerodynamic devices coupled to a tractor to a preset configuration based on the shape of a trailer coupled to the tractor and based on the length of a gap between the tractor and the trailer, the preset configuration being selected from a database correlating aerodynamic device configurations, trailer shapes and gap sizes;
while the tractor and trailer are traveling, measuring one or more of the air pressure adjacent to the tractor, the air pressure adjacent to the trailer and the air motion speed and angle relative to the longitudinal axis of the tractor at a location that the tractor and trailer have yet to reach; and
adjusting the position of at least one of the one or more aerodynamic devices in response to at least one of the measured one or more of the air pressure adjacent to the tractor, the air pressure adjacent to the trailer and the air motion speed and angle relative to the longitudinal axis of the tractor at a location that the tractor and trailer have yet to reach.

* * * * *